Figure 1:
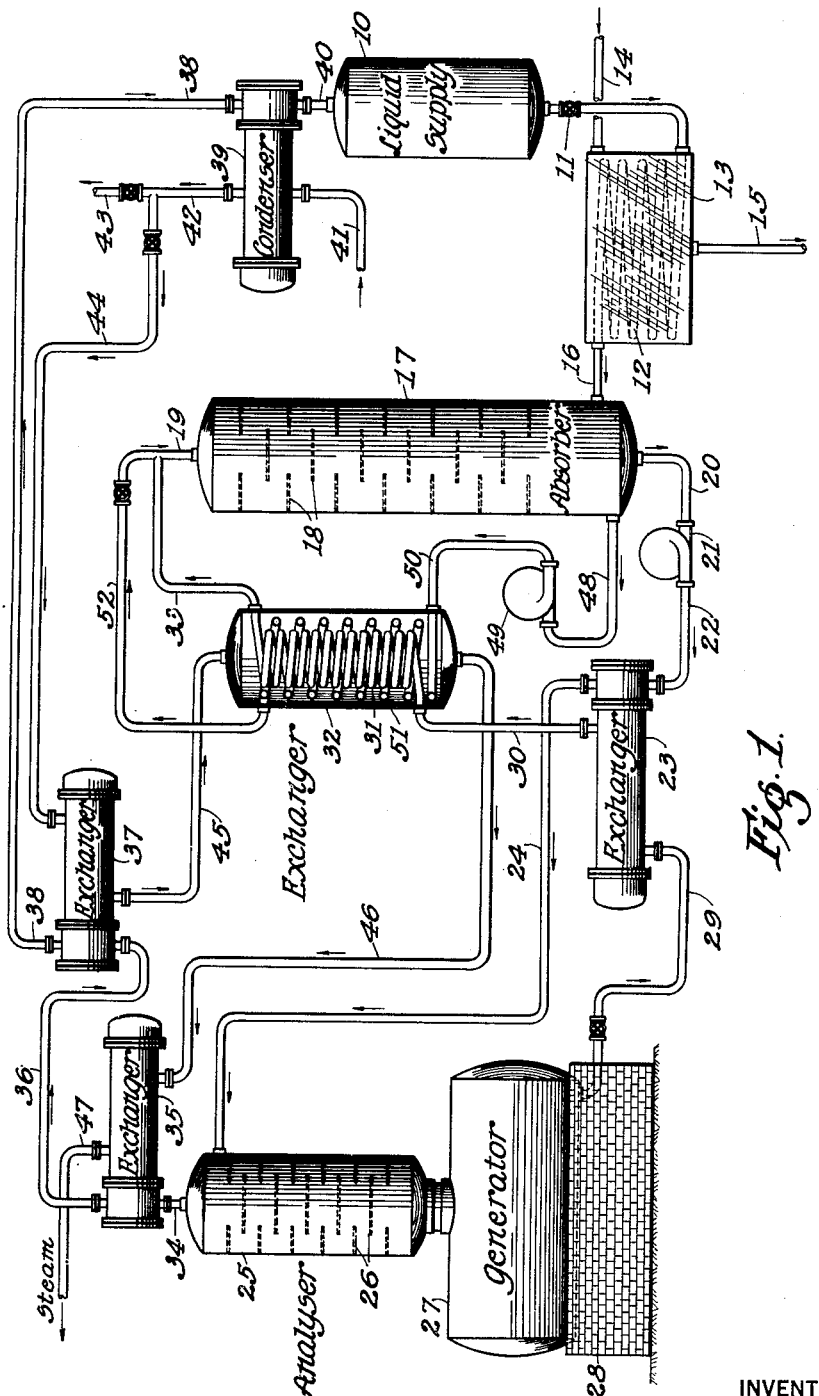

June 4, 1935.  F. D. REXWINKLE  2,003,310
REFRIGERATION
Filed June 4, 1932  2 Sheets-Sheet 1

INVENTOR
Fred D. Rexwinkle
BY Bruce K. Brown
ATTORNEY

June 4, 1935.  F. D. REXWINKLE  2,003,310
REFRIGERATION
Filed June 4, 1932  2 Sheets-Sheet 2
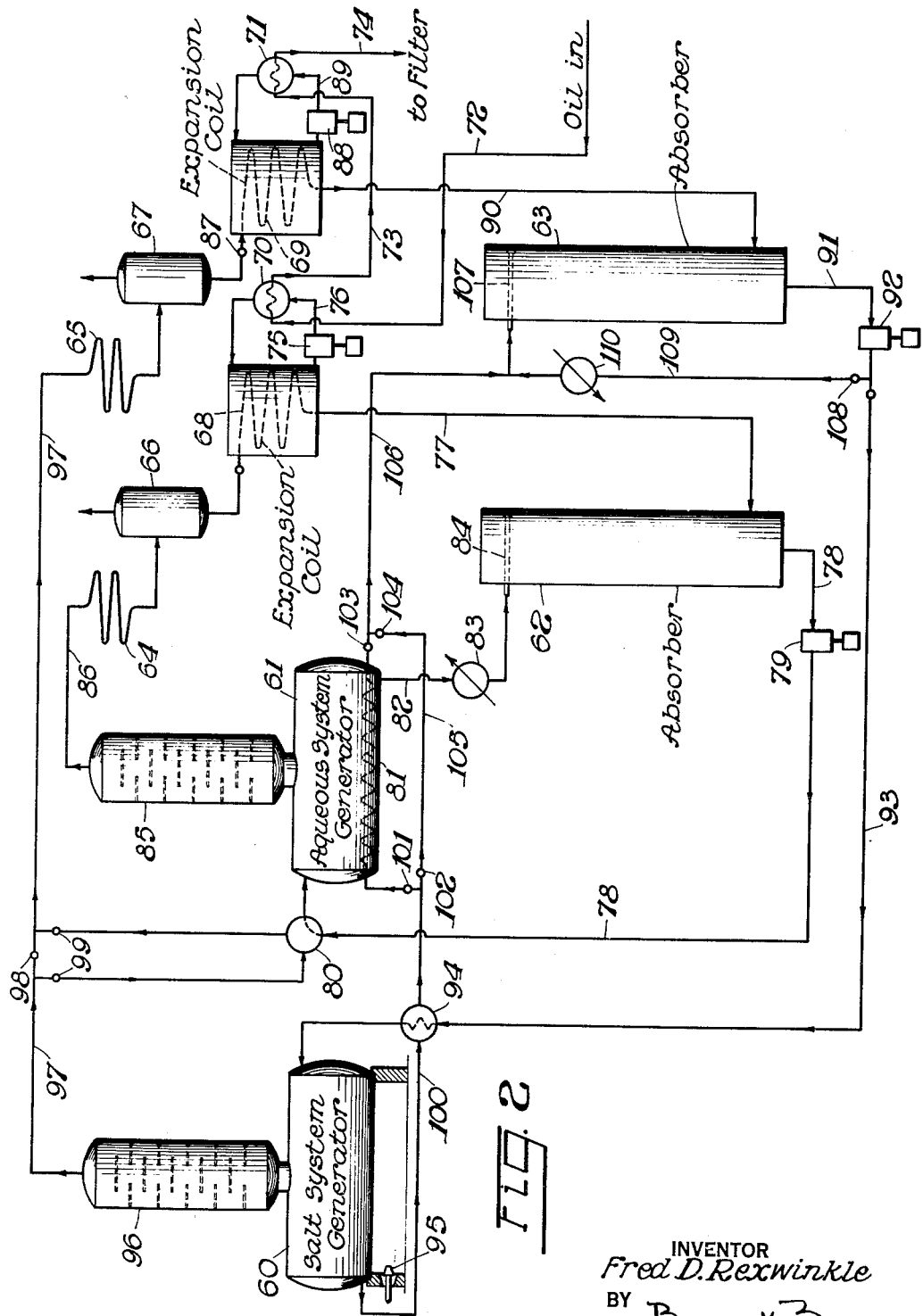
INVENTOR
Fred D. Rexwinkle
BY Bruce K. Brown
ATTORNEY Patented June 4, 1935

2,003,310

UNITED STATES PATENT OFFICE 2,003,310

REFRIGERATION

Fred D. Rexwinkle, Whiting, Ind., assignor to Standard Oil Company, Chicago, Ill., a corporation of Indiana Application June 4, 1932, Serial No. 615,396

11 Claims. (Cl. 62—179)

This invention relates to an absorption refrigeration system, and to an improved absorber medium therefor.

The object of the invention is to provide an absorption refrigeration system which will attain extremely low temperatures (as low as —80 to —90° F.) without the use of vacuum pumps or booster compressors. Such extremely low temperatures are not obtainable with aqueous absorption plants without the use of booster compressors because the vapor pressure of the aqueous ammonia in the absorber is too high to produce sufficient evaporation of the ammonia at the lower temperature desired; the object of my invention is to provide an absorber liquid which will have an extremely low vapor pressure; a particular object of my invention is to provide an absorbent for ammonia which has a greater affinity for ammonia than does water as determined by the dissociation temperature of the $NH_3$—absorbent complex.

A further object is to provide a refrigeration system in which exchangers operate at sufficiently high temperatures to generate steam from the cooling water. Ordinarily the cooling water is at a low heat level (about 100° F.) and the heat absorbed thereby is wasted. By operating my system at higher heat levels I am able to convert this cooling water into steam and to utilize the steam in performing useful work. I may also utilize this by-product heat in operating a conventional ammonia absorption plant as an adjunct to the low temperature refrigeration obtained by my new process.

A further object is to provide an ammonia absorption refrigeration system wherein the temperature of the absorber is equal to or above the boiling point of water, thus enabling the heat produced in the absorption operation to be utilized in producing useful steam.

A further object is to provide a system wherein exchangers may be operated over a wide temperature gradient for a given heat quantity so that an improved efficiency in heat transfer is obtained.

A further object is to decrease pumping costs by employing a desirable medium of high specific gravity, thereby cutting down the volume of absorbing medium which must be circulated. A further object is to provide an absorbing medium of relatively low specific heat. Other objects will be apparent from the following detailed description.

In practicing my invention I employ a complex zinc chloride ammonia salt at temperatures of from 300–400° F. to about 950° under pressures of from .12 atmospheres to 10 atmospheres. At 0.12 atmospheres a temperature of —90° F. can be obtained without the use of vacuum pumps or compressors, (also the latent heat of the ammonia which determines the available refrigeration effect is 7% higher at 0.12 atmospheres than at 1 atmosphere). The specific heat of the zinc chloride complex ammonia salt has not been accurately determined, but it is not greater than 0.2 gram calories per degree centigrade, or 0.2 B. t. u. per pound per degree Fahrenheit. The specific gravity of the complex zinc chloride salt is likewise indefinite, but since the specific gravity of zinc chloride is about 2.9 it is estimated that the specific gravity of the fused salt is about 2. Since my entire system operates at very high temperatures, the cooling water from the exchangers is converted into steam which can be utilized to accomplish useful work.

The invention will be more clearly understood by referring to the accompanying drawings which form a part of this specification. Figure 1 represents a diagrammatic elevation of my improved system, and Figure 2 illustrates a combinaton of my improved refrigerating system with a conventional aqueous absorption ammonia refrigeration system.

The general layout of my system is quite similar to that of ordinary absorption refrigeration systems,—ammonia is expelled from a generator, condensed, expanded to produce refrigeration, absorbed, and then passed to the generator where it is again expelled. In my system, however, lower pressures are obtained in the expansion coils and higher temperatures are used in the generator. It will be understood by those skilled in the art that special equipment and special insulation are required for these structures.

Liquid ammonia at about 78° F. is stored in tank 10 under a pressure of about 10 atmospheres. Refrigeration is effected by passing ammonia from this tank through reducing valve 11 and expanding it in coils 12 of chilling tank 13. A suitable refrigeration medium such as alcohol or carbon disulfide may be introduced into the chamber through pipe 14 at about —40° F. and removed therefrom through pipe 15 at about —80° to —90° F. Calcium chloride brine may be used instead of alcohol if the temperatures are not too low, and any substance of the required melting and boiling points may be used as a heat transfer medium. In some instances the ammonia may be expanded directly in contact with the objects to be cooled. For instance, the expansion coils may be mounted on the sides of a cold room, they may form a part of the quick-freezing apparatus for preserving perishable foods, such as meats, fish, fruits, etc., or they may be submerged in a mineral oil which is being chilled to cause a separation of paraffin wax.

The ammonia vapors from expansion coil 12 are withdrawn through pipe 16 through the base of absorber tower 17, which is maintained at a pressure of about 0.12 atmospheres and a temperature of about 400° F. This tower may be provided with suitable baffles 18 to insure efficient gas-liquid contact. Fused zinc chloride is introduced by pipe 19 at the top of the absorber tower at a temperature of about 300-350° F. It absorbs the ammonia vapors to form a complex zinc chloride ammonia salt, and since this reaction is exothermic and much heat is given off, it is usually necessary to recycle some of the absorbing liquid, as will be hereinafter described. I prefer to control the operation so that in the base of the tower the fused zinc chloride ammonia complex will contain about 1.7 mols of ammonia per mol of zinc chloride. This complex is removed from the absorber through pipe 20 and forced by pump 21 through pipe 22, heat exchanger 23 and pipe 24 to the top of analyzer tower 25. The analyzer tower is likewise provided with suitable baffles for effecting contact between gaseous ammonia and the incoming fused ammonia complex. Pump 21 maintains a pressure of about 10 atmospheres in the analyzer and in the generator 27 on which the analyzer is mounted. The generator may be an ordinary shell still mounted on suitable support 28 and adapted to be heated to a temperature of about 950° F. (the temperature in the top of the analyzer is about 690° F. or slightly higher).

The fused salt in the base of the generator corresponding to the weak liquor of an ordinary absorption plant may contain about 1 mol of ammonia per mol of zinc chloride, and it is withdrawn through pipe 29, passed through exchanger 23, and thence through pipe 30, coil 31, in exchanger 32, and finally through pipe 33 and pipe 19 into the top of the absorber tower. In exchanger 23 the low ammonia content salt gives up much of its heat to the high ammonia content salt, and in exchanger 32 the temperature of the low ammonia content salt is further lowered from about 430 to 300-350° F.

Ammonia from the top of the analyzer is passed through pipe 34, heat exchanger 35, pipe 36, heat exchanger 37, pipe 38, heat exchanger 39 and pipe 40 to liquid ammonia tank 10. In these heat exchangers the ammonia is cooled by the countercurrent flow of water, the cooling water is introduced through pipe 41 at about 70° F. and after passing through exchanger 39 and pipe 42 the water may be removed through pipe 43 or passed through pipe 44 to heat exchanger 37 in which the water is heated to a temperature of about 250-260° (the ammonia entering this exchanger being at about 430° F.). From heat exchanger 37 the water is passed through exchanger 32, wherein it is heated to a temperature of about 400° F. and finally it is heated in exchanger 35 with ammonia at a temperature of upwards of 600° F. At these temperatures the water is converted into superheated steam which is discharged through pipe 47 and utilized in operating pumps or generators.

Since a large amount of heat is given off in the absorber tower I prefer to recirculate a rather large volume of absorbing liquid through pipe 48, pump 49, pipe 50, coil 51 and pipe 52. The amount of absorbent recirculated will naturally depend largely on the operating conditions, for example, the concentration of ammonia which is being maintained in the absorber outlet liquid and the ratio of the amount of zinc chloride complex which is being circulated through the system to the amount of ammonia being absorbed. These factors are determined largely by the economical heat balance which is employed. The absorber liquid which is recirculated by pump 49 may be cooled in a separate heat exchanger maintained at a somewhat lower temperature than exchanger 32. The absorption of ammonia may likewise be carried out in two stages, a high temperature stage and a low temperature stage with separate recycling of absorption liquid on the low temperature stage and direct passage of rich absorber liquid from the high temperature stage to the analyzer and generator. The absorber column may also be cooled by indirect heat exchange coils and the heat thus dissipated may be employed in other parts of the process. The incoming ammonia vapors may be heated by suitable heat exchange.

As previously indicated, the waste heat from my refrigeration process may be used to operate a conventional aqueous ammonia absorption system which requires a much lower temperature in the generator, the heat for which may be supplied directly by exchange with the zinc chloride complex flowing in pipe 30 or with the superheated ammonia vapors flowing in pipe 34, or both. When the waste heat is employed in this manner I prefer to join the two systems with respect to the utilization of refrigeration also. Thus the ammonia produced in the aqueous system may be employed to precool lubricating oil for example and the ammonia produced in the low pressure zinc chloride system may be employed to complete the chilling of the oil to the low temperature desired.

The operation of my improved fused salt ammonia system, in combination with an aqueous ammonia system, is shown in Figure 2. Referring to the drawings, 60 is a fused salt ammonia generator or still, 61 is an aqueous ammonia generator or still, 62 is an aqueous ammonia absorber, and 63 is a fused salt ammonia absorber. The fused salt may be zinc chloride, 64 and 65 are ammonia condensers, while 66 and 67 are liquid ammonia receivers. 68 and 69 are refrigerating coils which may suitably be employed for the cooling of brine or other refrigeration transfer fluid. 70 and 71 are heat exchangers which may suitably be lubricating oil-chilling machines. In operation, the combination refrigerating process may be described as applied to the chilling of lubricating oil by the removal of paraffin wax. The oil is admitted from a suitable source of supply by line 72 leading to chiller 70 and thence by line 73 to chiller 71, thence by line 74 to the wax separator which may be a filter. The temperature of the oil is reduced in exchanger 70 to an intermediate point and thereafter in chiller 71 to a very low temperature at which the paraffin wax is separated sufficiently to produce low pour test lubricating oils.

Liquid ammonia from receiver 66 is expanded into coil 68 operated at about atmospheric pressure or above. Brine which surrounds coil 68 may be circulated to and from exchanger 70 by means of pump 75 and line 76. Ammonia vapors from coil 68 are led by line 77 to absorber 62 where they are dissolved in a stream of water and passed by line 78 and pump 79 to heat exchanger 80 and into regenerator 61. Heat is supplied to the stream passing through exchanger 80 and also to the generator by means of exchanger coil 81 as hereinafter described. The weak ammonia liquor is withdrawn from generator 61 by line 82, cooled in cooler 83 and introduced into absorber 62 by spray 84. Ammonia vapors are rectified in a tower 85 attached to still 61 and are thereafter led by line 86 to condenser coil 64.

Liquid ammonia from receiver 67 is expanded through valve 87 into coil 69 maintained at a pressure substantially below atmospheric pressure. The evaporation of liquid ammonia within the coil at this low pressure produces an extreme coldness which is transferred to exchanger 71 by means of a suitable intermediate fluid which may be brine, alcohol or other suitable refrigeration transfer medium and by means of pump 88 and line 89.

The ammonia vapor leaving coil 69 is conducted by line 90 to absorber 63 where it is absorbed in a stream of fused salt, for example, zinc chloride-$NH_3$ complex. The enriched solution is conducted by line 91 and pump 92 through 93 and heat exchanger 94 to still 60. Heat is supplied to this still by any suitable means, for example, by burner 95. Ammonia is driven from the salt through fractionator and deentrainor 96 and is led by line 97 under substantial pressure to condenser 65 previously described. If desired, valve 98 may be closed and valves 99 may be opened, permitting the hot vapors from the tower 96 to pass through heat exchanger 80.

The weak salt ammonia liquor in still 60 is withdrawn by line 100 to exchanger 94 and thence to heating coil 81 previously described. By properly setting valves 101, 102, 103 and 104, the fused salt stream may be partially by-passed through line 105. The salt is then conducted by line 106 to distributing device 107 in tower 63. A portion of the rich salt ammonia stream in line 93 may be recirculated by regulating valve 108, allowing the liquid to flow through line 109 to cooler 110 and back to distributor 107. In this way the heat liberated in the absorber 63 may be dissipated or employed for the production of steam or other useful purposes.

The operation of the pumps in my refrigeration system may be performed by using power derived from the steam generated as a by-product of the system. Thus I may employ steam driven circulating pumps for this purpose or I may use the steam to generate electricity and operate the pumps electrically. I may also use the steam power for compressing ammonia in a compression refrigeration system which I may tie in with the zinc chloride absorption system in a manner similar to that already described for the aqueous absorption system. I may also employ a steam driven compressor on the ammonia vapors passing from the generator through lines 34, 36 and 38 into condenser 39, thus enabling the condenser 39 and heat exchangers 35 and 37 to be operated at higher temperatures and/or permitting the generator 27 to be operated at a lower temperature.

The steam produced in the heat exchangers may be passed through superheater coils in the furnace where superheated steam is desired. These coils may suitably be arranged in an economizer section to obtain a more efficient use of the heat produced by the furnace 28. For carrying out the operation in this manner I may suitably employ a pipe heater of the rectangular box design having a radiant section and a convection section. The tubes which are exposed to radiant heat may be employed for the generation of ammonia vapors from the $ZnCl_2$—$NH_3$ complex. The tubes in the convection section which are subjected to lower temperatures may suitably be used to preheat the $ZnCl_2$—$NH_3$ complex and for generating steam or superheating steam. The $ZnCl_2$—$NH_3$ complex from the heater may be flashed in a flash drum for removal of the ammonia vapors and the residual liquid can be returned to the absorber tower through suitable heat exchangers in a manner similar to that shown in the accompanying diagrammatic layout previously described. It will be obvious that other absorption media may be employed in a refrigeration system similar to the one described without departing from the spirit of this invention. In general, I prefer to use the non-volatile salts having properties similar to those of zinc chloride. Thus I may use zinc nitrate and calcium or copper nitrate. It will be understood that when employing other salts than zinc chloride the temperature relationships throughout the system will be considerably modified, depending on the fusibility of the salt and its ammonia complex and depending also on the vapor pressure of the ammonia in equilibrium with the salt. Thus when I employ lithium nitrate I may operate the absorber at a lower temperature because of the increased fusibility of the $LiNO_3$—$NH_3$ complex, lithium nitrate ammoniacate being liquid at temperatures between 0° F. and 176° F. depending upon the ammonia content. I may likewise employ mixtures of salts as absorbents in which case I may obtain the advantage of greater fusibility in the mixture than exists with single components of the mixture, thereby permitting operation at very low pressures and correspondingly low temperatures in the expansion coils and absorber.

Although I have explained in detail the operation of the system with respect to one particular absorbent, I do not intend that the scope of my invention shall be limited by this description except as set forth in the following claims. As absorbents I may likewise employ substances which are solid at the temperatures prevailing in the absorber, in which case I may operate the absorber intermittently applying heat when necessary to fuse the absorbent and remove it from the absorber.

I claim:

1. In an ammonia absorption refrigeration process, the step comprising absorbing ammonia vapors at sub-atmospheric pressures in a fused metal salt consisting of calcium nitrate.

2. In an ammonia absorption refrigeration process, the step comprising absorbing ammonia vapors at sub-atmospheric pressures in a mixture of two fused-metal salts, said mixture having a melting point below that of the highest melting salt.

3. In an ammonia absorption refrigeration process the step comprising absorbing ammonia vapors at subatmospheric pressure in a fused metal salt consisting of zinc nitrate.

4. In an ammonia absorption refrigeration process wherein two stages of refrigeration are employed comprising an aqueous ammonia absorption system as the first stage operating with liquid ammonia at substantially atmospheric pressure or above, a fused metal salt ammonia absorption system as a second stage operating with liquid ammonia at substantially sub-atmospheric pressures, the improvement whereby a lubricating oil is refrigerated to a low temperature comprising initially cooling said oil in said first stage to an intermediate low temperature and thereafter further cooling said oil to a lower temperature in said second stage and exchanging heat between the superheated ammonia vapors from the generator in the second stage to the aqueous ammonia generator in the first stage.

5. In an ammonia absorption refrigeration process wherein a lubricating oil is successively refrigerated in two stages of refrigeration comprising an aqueous ammonia absorption system as the first stage operating with liquid ammonia at substantially atmospheric pressure or above, and a fused metal salt ammonia absorption system as a second stage operating with liquid ammonia at substantially sub-atmospheric pressures, the step comprising employing heat of the products from the fused salt generator in the second stage to heat the aqueous ammonia generator in the first stage.

6. In an ammonia absorption refrigeration process the step comprising absorbing ammonia vapors at sub-atmospheric pressure in a fused metal salt consisting of lithium nitrate.

7. In an ammonia absorption refrigeration process the step comprising absorbing ammonia vapors at sub-atmospheric pressure in a fused absorbent having as a base a metal salt of the class consisting of lithium nitrate, calcium nitrate, zinc nitrate, zinc chloride and non-volatile salts of metals having properties similar thereto.

8. In an ammonia absorption refrigeration process the step comprising absorbing ammonia vapors at sub-atmospheric pressure in a mixture of molten absorbents having as a base metal salts such as lithium nitrate, calcium nitrate and zinc nitrate, said mixture having a melting point below that of the principal component thereof.

9. A continuous absorption refrigeration process comprising the steps of generating refrigerant gas, changing the refrigerant gas to a more dense fluid phase by withdrawal of heat, expanding the refrigerant to effect refrigeration, absorbing the used refrigerant gas at sub-atmospheric pressure in a molten absorbent having as a base a non-volatile metal salt of the class having properties similar to zinc chloride, and recovering the refrigerant gas therefrom by addition of heat, substantially as described.

10. An absorber for an absorption refrigeration apparatus comprising a vertically disposed receptacle having a liquid inlet at the top and a liquid outlet below the liquid wherein means are provided for recycling a portion of the rich absorbent liquid from the base to the top of the absorber, a refrigerant vapor inlet, and means for spreading the absorbent liquid in a thin stream within the receptacle whereby a proportionally large surface of the absorbent liquid is exposed directly to the vapor of the refrigerant agent.

11. An absorber for an absorption refrigeration apparatus comprising a vertically disposed receptacle having a liquid inlet and a liquid outlet wherein means are provided for recycling a portion of the rich absorbent liquid from the base to the top of the absorber, a refrigerant vapor inlet above the liquid level in the absorber, means for exposing the surface of the absorbent liquid within the receptacle directly to the vapor of the refrigerant agent, and means for maintaining sub-atmospheric pressure in the absorber.

FRED D. REXWINKLE.